(12) United States Patent
Gomez et al.

(10) Patent No.: US 9,989,835 B1
(45) Date of Patent: Jun. 5, 2018

(54) SYSTEM AND METHOD FOR MOUNTING A CAMERA ON A WORK VEHICLE

(71) Applicant: CNH Industrial America LLC, New Holland, PA (US)

(72) Inventors: Lorenzo Anthony Gomez, Westmont, IL (US); Mark Steven Draeger, Oak Creek, WI (US); Daniel Alan Morey, Mundelein, IL (US); Douglas L. Waco, Oak Park, IL (US); William L. Schroeder, Cary, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days. days.

(21) Appl. No.: 15/428,831

(22) Filed: Feb. 9, 2017

(51) Int. Cl.
*G03B 17/56* (2006.01)
*G03B 17/02* (2006.01)
*B60R 11/04* (2006.01)
*B60R 11/00* (2006.01)

(52) U.S. Cl.
CPC ............ *G03B 17/561* (2013.01); *B60R 11/04* (2013.01); *G03B 17/02* (2013.01); *B60R 2011/004* (2013.01); *B60R 2011/005* (2013.01); *B60R 2011/0052* (2013.01)

(58) Field of Classification Search
USPC ........................................................ 396/419
See application file for complete search history.

(56) References Cited

U.S. PATENT DOCUMENTS

| | | | |
|---|---|---|---|
| 4,482,960 A | 11/1984 | Pryor | |
| 4,868,752 A | 9/1989 | Fujii et al. | |
| 5,911,669 A | 7/1999 | Stentz et al. | |
| 6,678,001 B1 * | 1/2004 | Elberbaum | G08B 13/19619 348/373 |
| 7,404,355 B2 | 7/2008 | Viaud et al. | |
| 7,937,923 B2 | 5/2011 | Biziorek | |
| 7,967,371 B2 * | 6/2011 | Khanna | H04N 5/2251 296/187.01 |
| 8,706,341 B2 | 4/2014 | Madsen et al. | |
| 8,917,904 B2 | 12/2014 | Zhang et al. | |
| 9,444,983 B2 * | 9/2016 | Liu | H04N 5/2252 |
| 2009/0037059 A1 | 2/2009 | Huster et al. | |
| 2010/0253784 A1 | 10/2010 | Oleg | |
| 2011/0240701 A1 * | 10/2011 | Totani | B60R 11/00 224/555 |

(Continued)

FOREIGN PATENT DOCUMENTS

WO         9809207         3/1998

OTHER PUBLICATIONS https://www.aliexpress.com/item/Free-Shipping-New-Auto-Car-Security-Front-View-Logo-Camera-Wide-Degree-Front-View-Grill-Grille/1883701086.html?spm=2114.01010208.3.2.SDqMyD&ws_ab_test=searchweb0_0,searchweb201602_4_10065_10068_10000009_10084_10000025_10083_10000029_10080_10082_10081_10000028_10110_10111_10112_10060_10113_10062_10114_10115_10056.*

(Continued)

*Primary Examiner* — Clayton E Laballe
*Assistant Examiner* — Linda B Smith
(74) *Attorney, Agent, or Firm* — Rickard K. DeMille; Rebecca L. Henkel

(57) ABSTRACT

A camera mounting assembly includes a first bezel configured to be positioned on a first side of a panel of a work vehicle and to support a camera. The camera mounting assembly also includes a second bezel configured to be positioned on a second side of the panel and to couple to the first bezel to support the camera between the first bezel and the second bezel, and to couple the camera mounting assembly to the panel.

14 Claims, 6 Drawing Sheets

(56) References Cited

U.S. PATENT DOCUMENTS

| | | | | |
|---|---|---|---|---|
| 2012/0267491 | A1* | 10/2012 | Chiu | F16M 11/041 |
| | | | | 248/221.11 |
| 2014/0158731 | A1* | 6/2014 | Squire | B60R 11/04 |
| | | | | 224/545 |
| 2015/0163993 | A1 | 6/2015 | Pettersson | |
| 2015/0354943 | A1 | 12/2015 | Posselius et al. | |
| 2016/0264188 | A1* | 9/2016 | Allen | B62D 27/02 |

OTHER PUBLICATIONS

503_10055_10054_10059_10099_501_10078_10079_10000022_10000012_10103_10073_10102_10000015_10096_10000018_10000019_10052_10053_10107_10050_10106_10051-10102,searchweb201603_9,afswitch_5,single_sort_i_default&btsid=.*

Jamie Hedigan; "Tractor Cameras Ireland"; Video You Tube; https://www.youtube.com/watch?v=HaLV2DY4Or8; Dec. 17, 2013; Last accessed Jan. 18, 2017.

Ray Massey; "Ford's cars can now see round Corners: Splitview camera warns of obstacles even on blind functions"; DailyMail.com; http://www.dailymail.co.uk/sciencetech/article-3135933/Ford-s-cars-round-CORNERS-Split-view-camera-warns-obstacles-blind-junctions.html; Jun. 23, 2015; Last accessed Jan. 18, 2017.

* cited by examiner

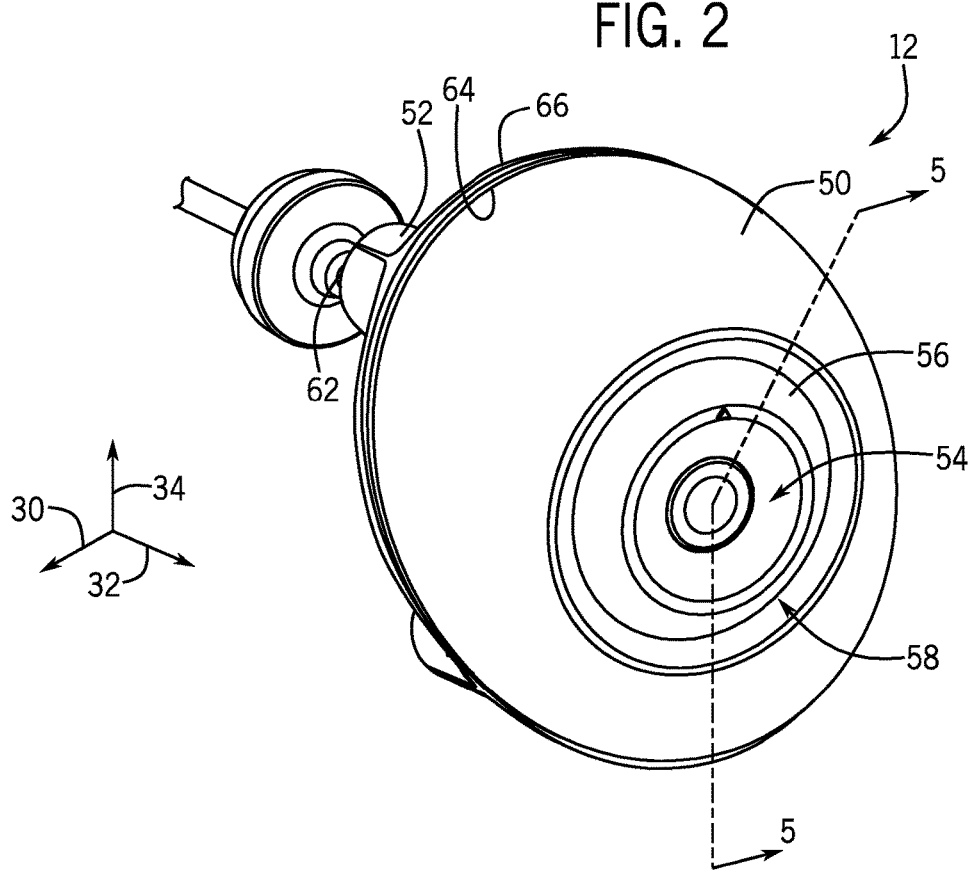
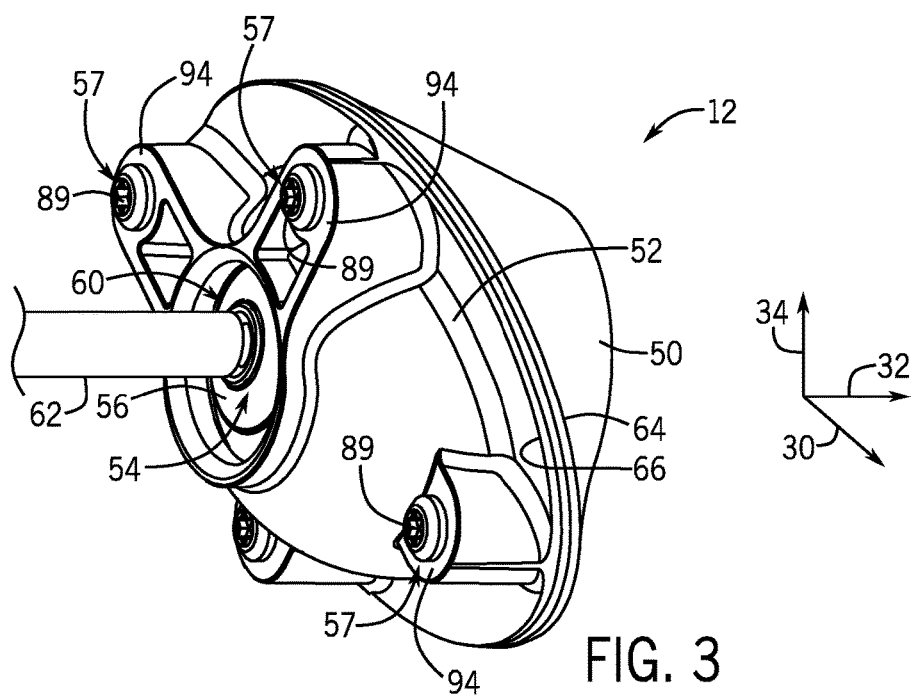

SYSTEM AND METHOD FOR MOUNTING A CAMERA ON A WORK VEHICLE

BACKGROUND

The disclosure relates generally to camera mountings, and more specifically, to a camera mounting system for a work vehicle.

Generally, work vehicles (e.g., tractors, harvesters, skid steers, etc.) may be used in challenging environments with various obstacles, such as uneven surfaces, rocks, or the like. Such obstacles may be not be entirely visible from an operator's point of view. For example, a front of the work vehicle may reach an obstacle before the operator can see the obstacle.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment a camera mounting assembly includes a first bezel configured to be positioned on a first side of a panel of a work vehicle and to support a camera. The camera mounting assembly also includes a second bezel configured to be positioned on a second side of the panel and to couple to the first bezel to support the camera between the first bezel and the second bezel, and to couple the camera mounting assembly to the panel.

In a second embodiment, a camera mounting assembly includes a first bezel configured to be positioned on a first side of a panel of a work vehicle, and a second bezel configured to be positioned on a second side of the panel, and to couple to the first bezel via one or more fasteners. The first bezel includes one or more clips configured to engage a second side of the panel to maintain the first bezel proximate to the panel to facilitate coupling the second bezel to the first bezel via the one or more fasteners during an assembly process. The first bezel and the second bezel are configured to support a camera.

In a third embodiment, a method of mounting a camera assembly to a work vehicle includes positioning a first bezel of the camera assembly on a first surface of a panel of the work vehicle, and positioning a second bezel of the camera assembly on a second surface of the panel of the work vehicle. The method of mounting a camera assembly to a work vehicle also includes coupling the second bezel to the first bezel to couple the camera assembly to the panel.

DRAWINGS

These and other features, aspects, and advantages of the present disclosure will become better understood when the following detailed description is read with reference to the accompanying drawings in which like characters represent like parts throughout the drawings, wherein:

FIG. 2 is a front perspective view of an embodiment of a camera mounting that may be utilized in the work vehicle of FIG. 1;

FIG. 3 is a rear perspective view of an embodiment of the camera mounting of FIG. 2;

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments disclosed herein relate generally to a camera mounting assembly for off-road vehicles (e.g., construction vehicles, utility vehicles, agricultural vehicles, work vehicles). The disclosed camera mounting assembly may be configured to mount a camera on a front grill screen of the off-road vehicle. The camera mounting includes a front bezel and a rear bezel. The front bezel is configured to be inserted into the front grill screen, and clips and/or tabs of the front bezel may hold the front bezel in place while the camera and rear bezel are added to the assembly. Once the front bezel, camera, and rear bezel are in place, the assembly may be clamped together via fasteners so that the front grill screen and camera housing is compressed by the front and rear bezel. Further, alignment tabs of the camera mounting assembly may provide for swift and uniform assembly during manufacturing.

Figure 1:
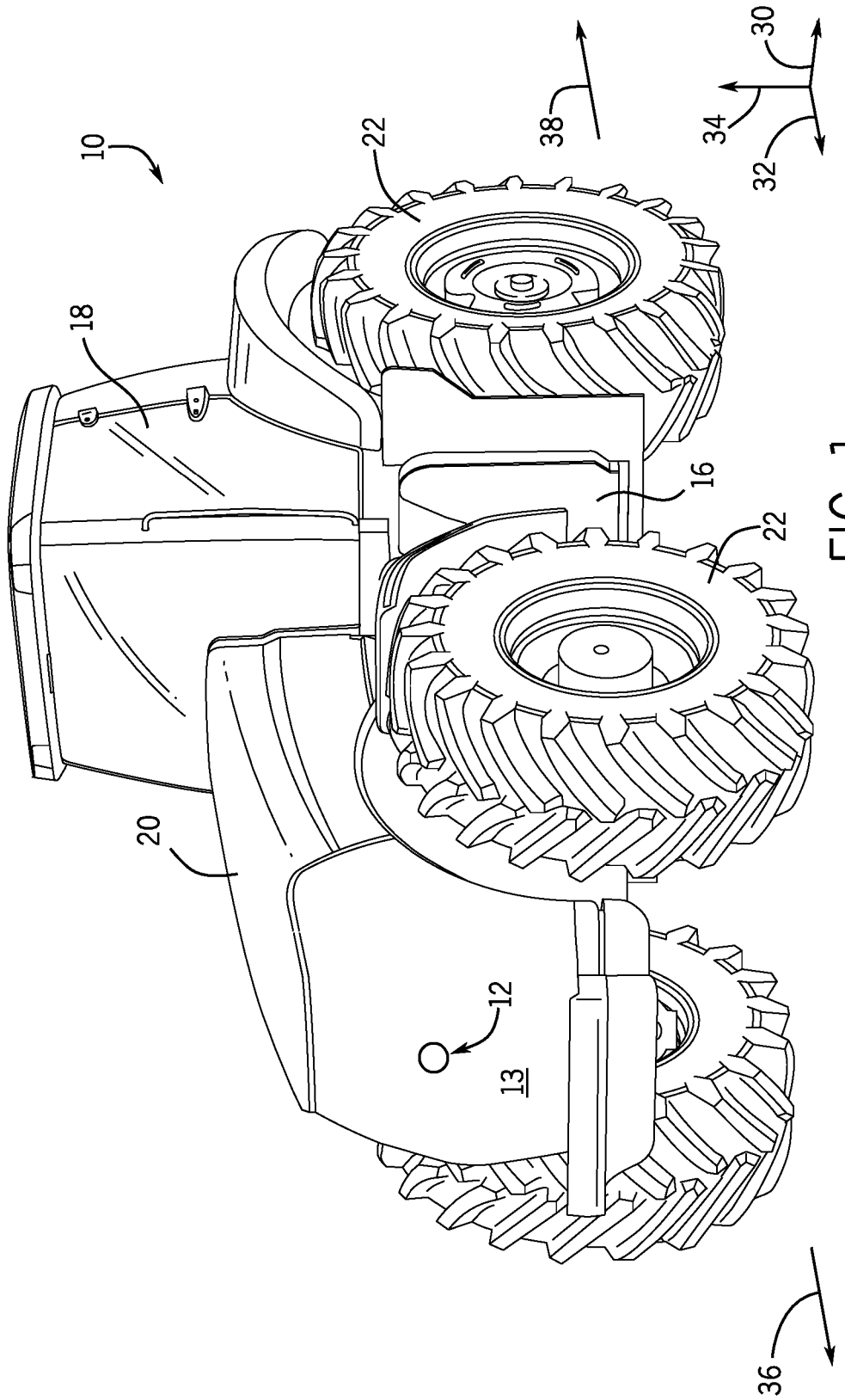
FIG. 1 is a perspective view of an embodiment of a work vehicle that may include a camera mounting.

With the foregoing in mind, FIG. 1 is a perspective view of an embodiment of a work vehicle 10 (e.g., off-road vehicle, utility vehicle) having a camera mounting 12 on a panel 13 (e.g., grill screen, front panel, side panel, rear panel). In the illustrated embodiment, the vehicle 10 includes a body 16 and a cabin 18 in which an operator may sit to operate the vehicle 10. The body includes a frame that may support an internal combustion engine, a transmission, and/or a powertrain configured to drive one or more wheels 22 (e.g., tracks) configured to carry the work vehicle 10 across a field. The body 16 may also include a hood 20 that covers elements of the work vehicle 10, such as the engine, the transmission, the powertrain etc. As illustrated, at least a portion of the camera mounting 12 may be generally visible on an exterior side of the panel 13 of the vehicle. However, the camera mount 12 may have components on an interior side of the panel 13 of the work vehicle 10 as well.

The vehicle 10 and/or the camera mounting 12 may be described with reference to a lateral axis or direction 30, a longitudinal axis or direction 32, and a vertical axis or direction 34. Additionally, the vehicle 10 may travel in a forward direction 36 (e.g., a forward direction of travel) or a rearward direction 38 (e.g., a rearward direction of travel). In the illustrated embodiment, the vehicle 10 is an agricultural tractor. However, any suitable agricultural or off-road vehicle, including self-propelled vehicles, sprayers, combines, trucks, and so forth may utilize aspects of the disclosed embodiments. It should be understood that in some vehicles, the wheels 22 may be replaced with other drive systems (e.g., tracks). Further, it should be noted that when describing the position of the camera mounting 12 on the panel 13 (e.g., grill screen), the camera mounting 12 may be positioned on any suitable panel (e.g., plate, sheet, screen, or the like) on any side of the work vehicle. In some embodiments, there may be one or more camera mountings on one or more panels of the work vehicle 10.

FIG. 2 is a front perspective view and FIG. 3 is a rear perspective view of an embodiment of the camera mounting 12 that may be utilized in the work vehicle 10 of FIG. 1. It should be noted that the directions/axes 30, 32, 34 that are described herein are relative to the position of the camera mounting 12. For example, if the camera mounting 12 is on a front of the work vehicle 10, then the longitudinal axis 32 may be parallel to the direction of travel 36. However, if the camera mounting 12 is on a lateral side of the work vehicle 10, then the longitudinal axis 32 may be perpendicular to the direction of travel 36. The camera mounting 12 includes a front bezel 50 (e.g., front clamp, external mounting) and a rear bezel 52 (e.g., rear clamp, internal mounting). The front bezel 50 and the rear bezel 52 may fasten (e.g., clamp, clip) together thereby compressing the panel 13 on which it is mounted. Further, the panel 13 may have an opening (e.g., cut-out, hole) configured to enable a camera 54 to fit within. More specifically, the opening in the panel 13 may be shaped to allow a camera housing 56, which houses the camera 54 (e.g., camera components such as a lens), to fit within the panel 13. For example, the camera housing 56 may be substantially spherical in shape. Accordingly, the opening in the panel 13 may be substantially circular in shape. Therefore, the front bezel 50 and the rear bezel 52 may fasten onto outer edges of the opening in the panel 13, thereby securing the camera 54 in between the front and rear bezels 50, 52 and within the opening in the panel 13. Furthermore, the front bezel 50 and the rear bezel 52 may each be substantially annular in shape and configured to interface with (e.g., contact) the camera housing 56. The camera mounting 12 may be clamped due at least in part to fasteners 57 (e.g., threaded fasteners, hi-lo screws, bolts, etc.). The fasteners 57 may be inserted from the rear bezel 52 in the longitudinal direction 32 and attach (e.g., fasten) to portions of the front bezel 50.

The camera 54 may be exposed via a front opening 58 of the front bezel 50. The front opening 58 may be substantially circular (e.g., annular) in shape to enable the camera 54 to rotate within the front opening 58. Further, the camera 54 may also be exposed via a rear opening 60 of the rear bezel 52. The rear opening 60 may be substantially circular (e.g., annular) in shape to allow the camera 54 to rotate within the rear opening 60. The camera 54 may also include a camera shaft 62 (e.g., camera cable or wire) which extends through the rear opening 60 to attach to a rear of the camera housing 56. The camera shaft 62 may be configured to transmit (e.g., transmit power, information, instructions, images, data, etc.) to and from the camera 54. In some embodiments, the camera shaft 62 may be configured to rotate (e.g., twist or shift) the camera 54 within the camera mounting 12.

Further, the front bezel 50 and the rear bezel 52 may be configured to have similarly shaped outer perimeters. For example, a front annulus 64 (e.g., front circumference, front outer edge) of the front bezel 50 may match in shape a rear annulus 66 (e.g., rear circumference, rear outer edge) of the rear bezel 52. The front annulus 64 and the rear annulus 66 may match so that, when viewed from an external point of view relative to the work vehicle 10, only the front bezel 50 (and the front of the camera 54) may be visible because the front bezel 50 has the same outer profile (e.g., circumference) as the rear bezel 52.

Figure 4:
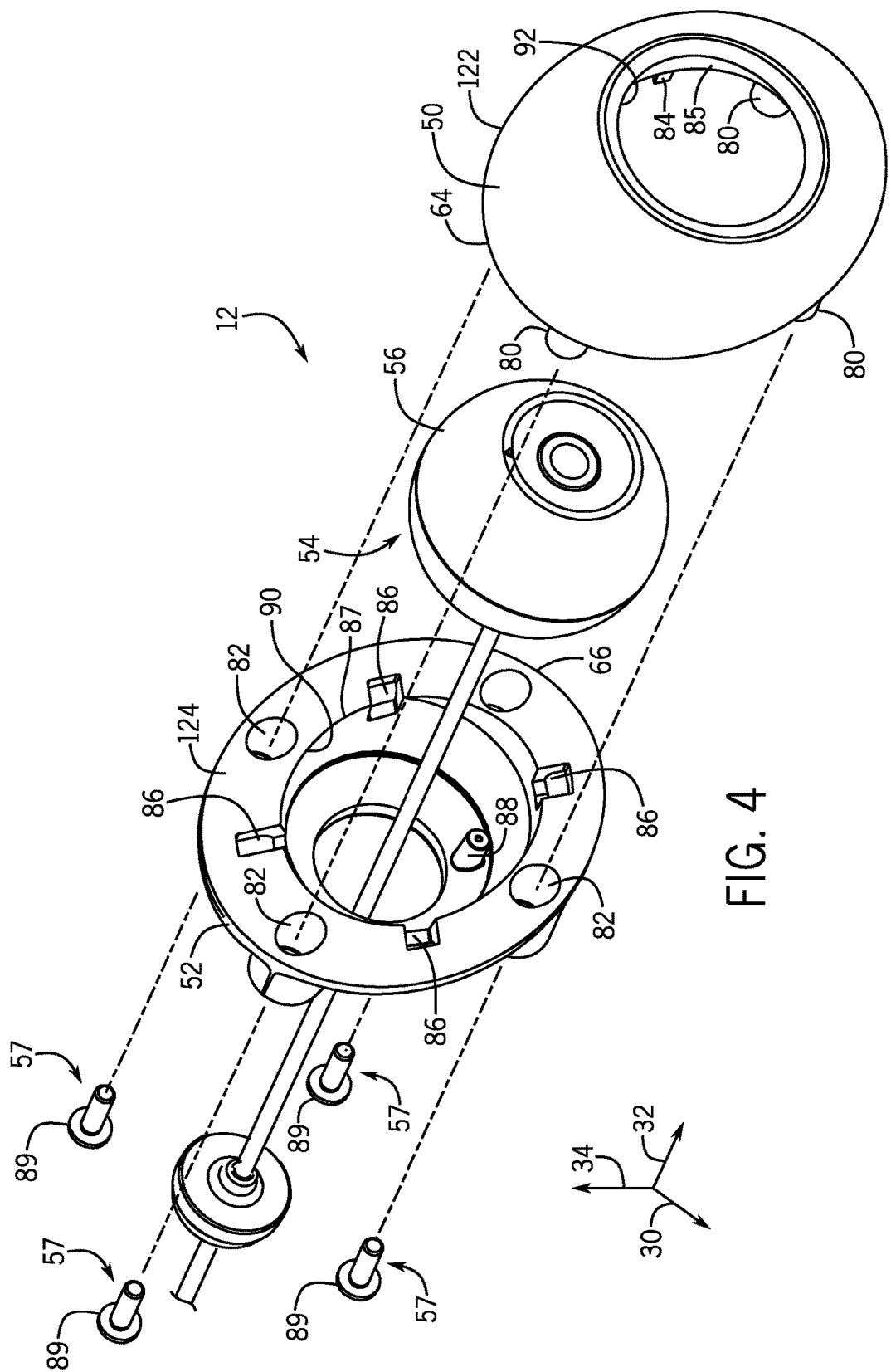
FIG. 4 is an exploded view of an embodiment of the camera mounting of FIG. 2.

FIG. 4 is an exploded view of an embodiment of the camera mounting 12 of FIG. 2. The front bezel 50 may have alignment tabs 80 (e.g., mounting tabs, support tabs) that extend (longitudinally) from a front bezel surface 122 (e.g., annular surface) and that may be inserted through openings in the panel 13 and into alignment tab recesses 82 (e.g., tab receivers, tab receiving holes) formed in a rear bezel surface 124 (e.g., annular surface) of the rear bezel 52. There may be 1, 2, 3, 4, 5, 6, or more alignment tabs 80 and corresponding alignment tab recesses 82. The front bezel 50 may have clips 84 (e.g., snap hooks, hooks, live-hinge clips, elastic clips, etc.) that may be inserted into clip recesses 86 (e.g., clip receiving holes, clip receivers) of the rear bezel 52. There may be 1, 2, 3, 4, 5, 6, or more clips 84 and corresponding clip recesses 86. The clips 84 and the clip recesses 86 may be positioned at respective radially-inner edges 85, 87 of the front bezel 50 and the rear bezel 52. In some embodiments, the clip 84 may clip (e.g., fasten) onto a portion (e.g., ledge) of the clip recess 86. Additionally or alternatively, in some embodiments, the clip 84 may clip or engage the panel 13 while a portion of the clip 84 resides within the clip recess 86 of the rear bezel 52. It should be understood that some or all of the alignment tabs 80 and/or some or all of the clips 84 may be provided on the rear bezel 52, and the assembly techniques adapted accordingly.

As shown, the camera mount 12 also includes a positioning pin 88. In the current embodiment, the positioning pin 88 is disposed on an interior 90 (e.g., rear bezel interior, interior curved surface, or camera-contacting surface) of the rear bezel 52. In some embodiments, the positioning pin 88 may be disposed on an interior 92 (e.g. front bezel interior, interior curved surface, or camera-contacting surface) of the front bezel 50. The positioning pin 88 may be configured to be inserted into a recess (e.g., hole, depression, dimple) within the camera housing 56. As described in detail below, the positioning pin 88 may be inserted into the recess so that when the camera mount 12 is assembled, the camera 54 may be easily oriented in a predetermined orientation (e.g., predetermined by the manufacturer) within the camera mount 12. In some embodiments, the positioning pin 88 may be removed (e.g., snapped off, broken off, disassembled, etc.) so that an orientation of the camera 54 may be changed. In some embodiments, there may be more than one positioning pin 88.

Further, the fasteners 57 may be inserted into the rear bezel 52 through the alignment tab recesses 82, and fastened to (e.g., threaded or screwed into) the alignment tabs 80. A head 89 of the fastener may contact a rear surface 94 (shown in FIG. 3) as the fastener 57 is fastened (e.g., torqued) into the alignment tab 80.

Figure 5:
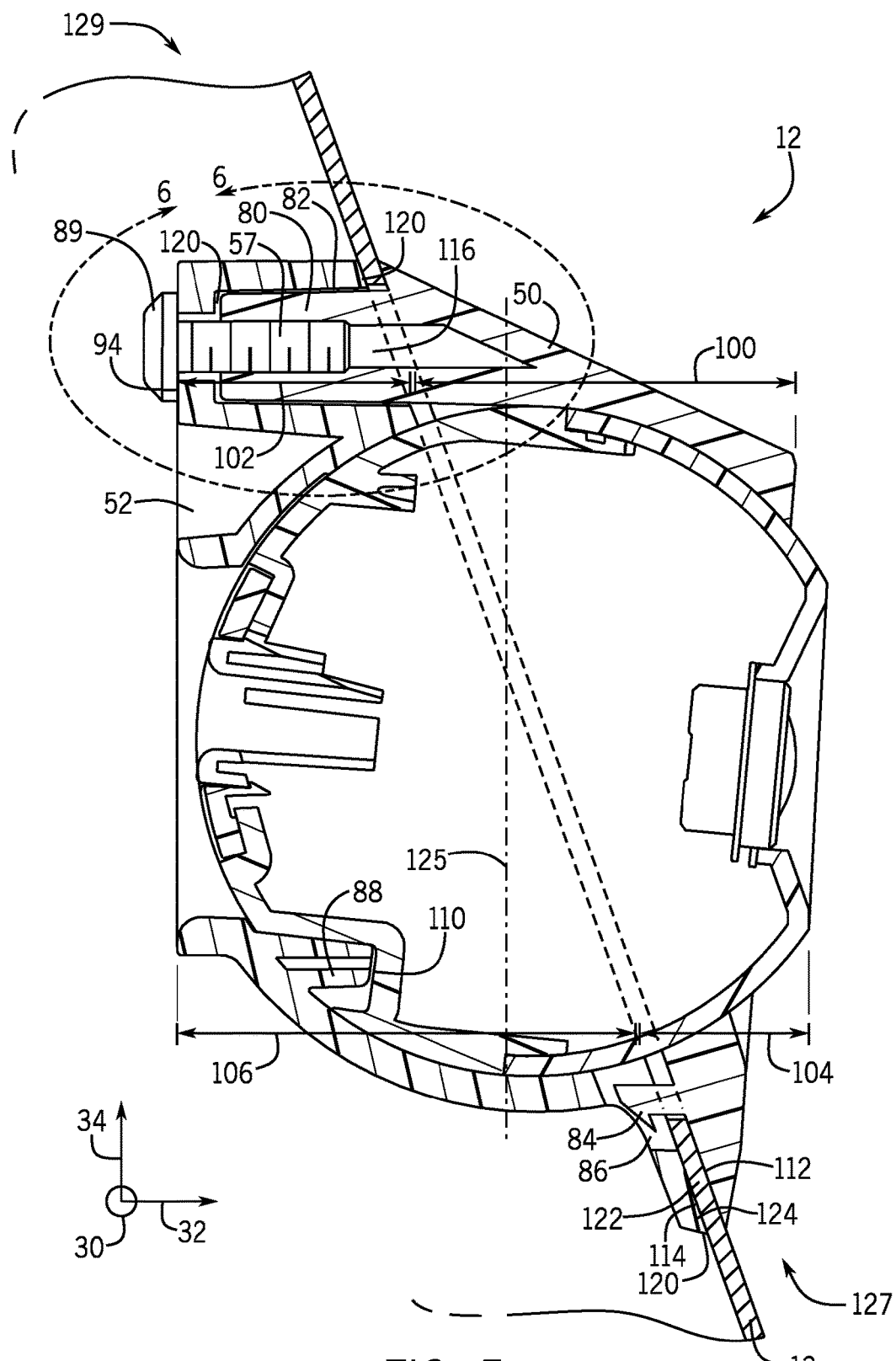
FIG. 5 is a cross-sectional view of an embodiment of the camera mounting of FIG. 2.

FIG. 5 is a cross-sectional view of an embodiment of the camera mounting 12 of FIG. 2 taken along line 5-5. The line 5-5 is shown so that it extends simultaneously in both the vertical and lateral direction 34, 30 to intersect the alignment tab 80, as well as to intersect the position pin 88 and the clip 84. As can be seen in the current view, the panel 13 may be disposed in a slanted (e.g., sloped) direction (e.g., in the vertical and longitudinal directions 34, 32 relative to a lateral 30 point of view) in between the front bezel 50 and the rear bezel 52. Thus, when assembled, the front bezel surface 122, the rear bezel surface 124, and the panel 13 may be sloped or angled relative to a vertical central axis 125 of the camera mount 12. As shown, a lower interface 127 between the front bezel 50, the rear bezel 52, and the panel 13 is on one side (e.g., forward or exterior side) of the vertical central axis 125, and an upper interface 129 is on another side (e.g., rearward or interior side of the vertical central axis 125 (e.g., relative to the longitudinal axis 32). As shown, a front bezel top length 100 may be longer than a front bezel bottom length 104. Similarly, a rear bezel top length 102 may be shorter than a rear bezel bottom length 106. The front bezel surface 122 and the rear bezel surface 124 may extend vertically or be at any of a variety of angles relative to the vertical axis 34 to accommodate various panel 13 configurations. In summation, while the panel 13 may be slanted, the camera mount 12 may be configured to clamp the camera 54 in a substantially longitudinal direction 32. In some embodiments, the camera mount 12 may be configured to direct (e.g., point) the camera 54 slightly downward towards a ground on which the work vehicle 10 is disposed upon.

As mentioned above, the positioning pin 88 may be inserted into a recess 110 of the camera 54. The recess 110 may be positioned longitudinally 32 rearward in the camera housing 56 and configured to receive the positioning pin 88. In some embodiments, where the positioning pin 88 is disposed on the front bezel interior 92, the recess 110 may correspondingly be positioned longitudinally 32 forward in the camera housing 56.

The clips 84 are configured to hold the front bezel 50 onto a first surface 112 (e.g., outer surface) of the panel 13. The front bezel 50 is an annular structure configured to receive the camera housing 56. While the front bezel 50 is engaged with the panel 13 via clips 84, the front bezel 50 may support the camera 54. In some embodiments, the clips 84 may be pushed through the panel 13 (e.g., via one or more openings) to engage with a second surface 114 (e.g., inner surface) of the panel 13. Thus, the panel 13 may have one opening for the camera and multiple openings for the clips and alignment tabs positioned about the circumference of one opening. In some embodiments, the clips 84 may not be in direct contact with the second surface 114, but are simply configured to hold the front bezel 50 in proximity of the panel 13. In some embodiments, the clips 84 may be in direct contact with the second surface 114 and are configured to hold the front bezel 50 so that it is in direct contact with the first surface 112 of the panel 13. When the clips 84 are engaged with the panel 13 and holding the front bezel 50 against, or proximate to, the first surface 112, the rear bezel 52 may be positioned so that the clips 84 are inserted into the clip recesses 86 (e.g., clip receivers).

While the front bezel 50 is clipped (via clips 84) onto the panel 13 and supports the camera 54, the rear bezel 52 may be positioned onto the back of the camera housing 56 proximate to the second surface 114. When the rear bezel 52 is positioned onto the camera 54 (e.g., camera housing 56), the alignment tabs 80 may be received by the alignment tab recesses 82, the positioning pin 88 may be received by the pin recess 110, and the clips 84 may be received by the clip recess 86. Further, the rear bezel 52 may be secured to the camera housing 56 due at least in part to the fasteners 57 engaging with the alignment tabs 80. To engage with the alignment tabs 80, the fasteners 57 may screw into a bore 116 (e.g., threaded bore) of the alignment tab 80 and the head 89 of the fastener 57 may contact the rear surface 94. Once the fasteners 57 have been screwed into the alignment tabs 80 and the heads 89 of the fasteners 57 are in contact with the rear surface 94, the front bezel 50 may be in direct contact with the first surface 112 and/or the rear bezel 52 may be in direct contact with the camera housing 56. The camera 54 is clamped in between the front and rear bezel 50, 52 because the camera housing 56 is in direct contact (e.g., interference) with the front bezel 50 and the rear bezel 52. In some embodiments, while the camera 54 is clamped in place, there may be a gap 120 in between the alignment tabs 80 and the alignment tab recesses 82. The gap 120 may also be present in between the rear bezel 52 and the second surface 114 of the panel 13. In some embodiments, the gap 120 is approximately equal to or greater than 0.5 millimeters (mm). In some embodiments, the gap 120 may be approximately 0.25 to 0.75 mm or 0.4 to 0.6 mm.

When the fasteners 57 are torqued, the front bezel 50 and the rear bezel 52 may apply a pressure (e.g., compress) the panel 13 in the longitudinal direction 32. As such, a front bezel surface 122 may contact the first surface 112 of the panel 13. Similarly, a rear bezel surface 124 may contact, or be proximate to, the second surface 114 of the panel 13. In the current embodiment, the panel 13, the front bezel surface 122, and the rear bezel surface are all linear with respect to the point of view as shown in FIG. 5. However, in some embodiments, the panel 13 on which the camera mount 12 is mounted on may have a curved (e.g., contoured, concave, convex, sloping, etc.) cross section. In these embodiments, the front bezel surface 122 and the rear bezel surface 124 may have compatibly shaped surfaces. In other words, regardless of the shape of the panel 13, the front bezel surface 122 may still be in contact with the first surface 112 of the panel 13. Similarly, the rear bezel surface 124 may still be in contact, or be proximate to, the second surface 114 of the panel 13.

Figure 6:
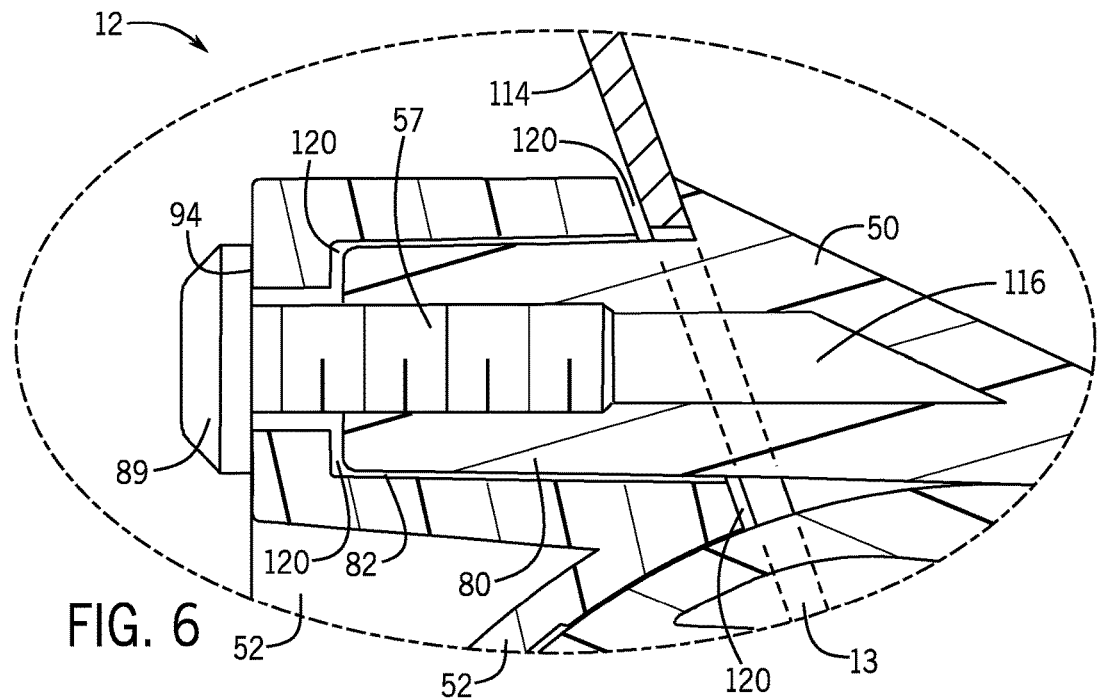
FIG. 6 is a cross-sectional view of a portion of an embodiment of the camera mounting of FIG. 2 in a first position.

FIG. 6 is a cross-sectional view of an embodiment of the camera mounting 12 taken along line 6-6 of FIG. 5 while in a first position. As described above, the gap 120 exists between the alignment tab 80 and the alignment tab recess 82, and between the rear bezel 52 and the second surface 114 of the panel 13. The camera 54 may be clamped tightly in place across the panel 13 (e.g., in contact with the front bezel 50 and the rear bezel 52), despite the presence of the gap 120. In the current position (e.g., first position), the fastener head 89 may be in direct contact with the rear surface 94 of the rear bezel 52. From this position, the fastener 57 may be torqued (e.g., screwed) further into the bore 116. Further torqueing the fastener 57 may result in the length (e.g., along the longitudinal axis 32) of the gap 120 decreasing. Further torqueing the fastener 57 may also result in further clamping (e.g., compression) of the camera housing 56 in between the front and rear bezels 50, 52, thereby increasing pressure on the camera housing 56. While in the first position (e.g., while there is some distance between the rear bezel 52 and the panel 13), the camera 54 may be rotated. The camera 54 may be rotated so that it may communicate different views to the user of the work vehicle 10. The camera 54 may be less susceptible to rotation after the camera mounting 12 has been fully clamped and the rear bezel 52 is contacting the panel 13 (e.g., while in a second position as described below).

Figure 7:
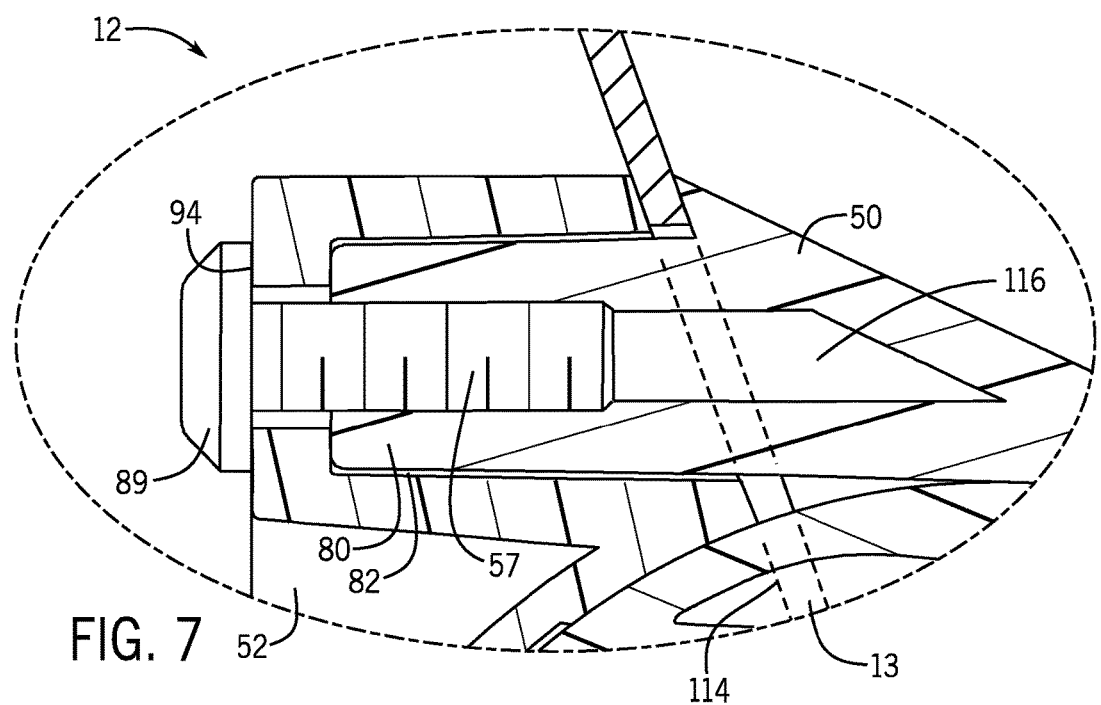
FIG. 7 is a cross-sectional view of the portion of the camera mounting of FIG. 6 in a second position.

FIG. 7 is a cross-sectional view of an embodiment of the camera mounting 12 taken along line 6-6 of FIG. 5 while in a second position. The camera mounting 12 may be in the second position as a result of the fasteners 57 being further torqued (e.g., screwed) from the first position. As the fasteners 57 are torqued and the camera mounting 12 transitions from the first position to the second position, the rear bezel 52 may move in the longitudinal direction 32 towards the front bezel 50. In some embodiments, if the front bezel 50 is not flush against the first surface 112, the front bezel 50 may also move in the longitudinal direction 32 towards the rear bezel 52. While in the second position, the gap 120 seen in FIG. 6 is not present or reduced as compared to the first position of FIG. 6. Further, both the camera housing 56 and the panel 13 may be in compression from the front and rear bezels 50, 52. In this position, similar to the first position, the camera housing 56 is held securely in place across the panel 13. However, in this position, relative to the first position, the panel 13 and the camera housing 56 may experience a higher compressive force. It should also be noted that loosening the fastener 57 may decrease the compression experienced by the panel 13 and the camera housing 56.

Figure 8:
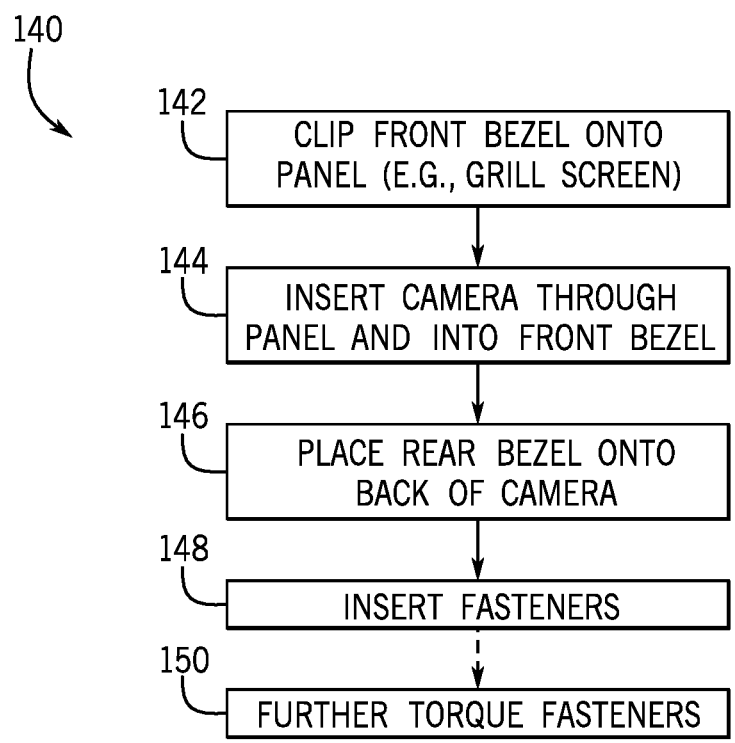
FIG. 8 is an embodiment of a method of assembly of the camera mounting of FIG. 2.

FIG. 8 illustrates a flow chart of an embodiment of a method 140 to assemble a camera mounting 12 to mount a camera 54 onto a panel. The front bezel 50 of the camera mounting 12 is clipped (block 142) onto a panel 13 (e.g., front grill screen) via clips 84. Once the front bezel 50 is clipped on the panel 13, the front bezel 50 may interface with a first surface 112 of the panel 13. As described above, the front bezel 50 may be annular in shape and configured to receive the camera 54. In mounting the front bezel 50 to the panel 13, alignment tabs 80 of the front bezel 50 may be aligned with, and inserted into, a corresponding cut-out (e.g., hole or opening) in the panel 13 configured to receive the alignment tabs 80. Once the front bezel 50 engages the panel 13, the camera 54 is inserted (block 144) into the front bezel 50 (e.g., against the interior surface 92). Once the camera 54 is inserted into the front bezel 50, the front bezel 50 may support the camera 54. A rear bezel 52 is placed (block 146) onto the back of the camera 54 so that an inner surface 90 of the rear bezel 52 is interfacing (e.g., in contact with) the camera housing 56. When the rear bezel 52 is placed (block 146) onto the back of the camera 54, recesses 82 in the rear bezel 52 may be aligned with, and placed about, the alignment tabs 80 of the front bezel 50. Similarly, other recesses 86 in the rear bezel 52 may be aligned with, and placed about, the clips 84 of the front bezel 50. Further, a positioning pin 88 of the rear bezel 52 may be aligned with and inserted into a recess 110 in the camera 54. As discussed above, alignment of the positioning pin 88 provides uniform and simple orientation of the camera 54 during assembly. Then, fasteners 57 may be inserted (block 148) through the rear bezel 52 and into the alignment tabs 80 of the front bezel 50. The fasteners 57 may be torqued (e.g., screwed) until the fastener heads 89 are in contact with the rear bezel 52. At this point, the front bezel 50 may be in direct contact with the front of the camera 54 and/or the first surface 112 of the panel, and the rear bezel may be in direct contact with the rear of the camera and/or the second surface 114 of the panel 13. As discussed above, there is a gap 120 in between the recess 82 of the rear bezel 52 and the alignment tab 80 of the front bezel 50. Similarly, there may be a gap 120 in between the rear bezel 52 and the second surface 114 of the panel 13.

While the front and rear bezels 52, 54 are interfacing with the camera 54, the camera 54 is clamped tightly in place. Although the camera 54 is clamped tightly in place across the panel 13 in between the front and rear bezels 52, 54, the presence of the gap 120 described above allows for further clamping and compression of the panel 13 and/or the camera housing 56. For example, the fasteners 57 may be further torqued (block 150) until the rear bezel 52 is in direct contact (e.g., interfacing) with the second surface 114 of the panel 13 and the alignment tabs 80 of the front bezel 50.

Furthermore, it may be appreciated that, while the figures in this written description depict a certain style of bezels, the front and rear bezel 50, 52 may change in shape. However, the function of the bezels may remain the same as described above. Further, it is to be understood that the camera 54 may rotate within the camera mounting 12 (i.e., rotate within the front and rear bezel 50, 52) to have different positions. For example, the camera 54 may point substantially in the longitudinal direction 32, but may rotate in the vertical direction 34 to see more of the ground, or less of the ground on which the work vehicle is disposed upon. It should also be noted that the front and rear bezel 50, 52 may be formed via molding (e.g., injection molding). In some embodiments, the front and rear bezel 50, 52 may be made out of nylon, a different plastic, or a combination of nylon and other plastic(s). In some embodiments, some or all of the front and rear bezel 50, 52 may be made from a metallic material.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A camera mounting assembly, comprising:
   a first bezel configured to be positioned on a first side of a panel of a work vehicle and to support a camera; and
   a second bezel configured to be positioned on a second side of the panel and to couple to the first bezel to support the camera between the first bezel and the second bezel and to couple the camera mounting assembly to the panel,
   wherein at least one of the first bezel or the second bezel comprises a positioning pin configured to engage a corresponding recess of the camera.

2. The camera mounting assembly of claim 1, wherein each of the first bezel and the second bezel is an annular structure.

3. The camera mounting assembly of claim 1, wherein each of the first bezel and the second bezel is configured to directly contact a housing of the camera.

4. The camera mounting assembly of claim 1, wherein the first bezel comprises one or more hooks configured to engage the panel.

5. The camera mounting assembly of claim 1, wherein one of the first bezel or second bezel comprises an alignment tab and the other of the first bezel or the second bezel comprises a corresponding recess configured to receive the alignment tab to facilitate coupling the first bezel and the second bezel to one another.

6. The camera mounting assembly of claim 1, wherein the first bezel and the second bezel are configured to be coupled to one another by one or more threaded fasteners.

7. The camera mounting assembly of claim 1, wherein the panel is compressed in a longitudinal direction between the first bezel and the second bezel when the first bezel and the second bezel are coupled to one another.

8. The camera mounting assembly of claim 1, wherein the panel comprises a grill screen.

9. The camera mounting assembly of claim 4, wherein the one or more hooks are configured to extend through one or more openings in the panel to engage a second side of the panel to couple the first bezel to the panel to facilitate assembly of the camera mounting assembly.

10. A method of mounting a camera assembly to a work vehicle, comprising:
- positioning a first bezel of the camera assembly on a first surface of a panel of the work vehicle;
- positioning a second bezel of the camera assembly on a second surface of the panel of the work vehicle;
- coupling the second bezel to the first bezel to couple the camera assembly to the panel; and
- inserting an alignment tab of one of the first bezel or the second bezel through an opening formed in the panel and into a corresponding recess of the other one of the first bezel or the second bezel to facilitate coupling the second bezel to the first bezel.

11. The method of claim 10, comprising inserting a clip of the first bezel through the panel to engage the second surface of the panel to maintain the first bezel in a position proximate to the panel to facilitate coupling the second bezel to the first bezel.

12. The method of claim 10, comprising coupling the second bezel to the first bezel via a threaded fastener, wherein the threaded fastener may be rotated until the camera mounting assembly reaches a first position in which the first bezel and the second bezel contact a camera housing.

13. The method of claim 12, comprising further rotating the threaded fastener until the camera mounting assembly reaches a second position in which the first bezel and the second bezel compress the camera housing and the panel.

14. A method of mounting a camera assembly to a work vehicle, comprising:
- positioning a first bezel of the camera assembly on a first surface of a panel of the work vehicle;
- positioning a second bezel of the camera assembly on a second surface of the panel of the work vehicle;
- coupling the second bezel to the first bezel to couple the camera assembly to the panel;
- coupling the second bezel to the first bezel via a threaded fastener, wherein the threaded fastener may be rotated until the camera mounting assembly reaches a first position in which the first bezel and the second bezel contact a camera housing;
- inserting an alignment tab of one of the first bezel or the second bezel into a corresponding recess of the other one of the first bezel or the second bezel to facilitate coupling the second bezel to the first bezel; and
- inserting the threaded fastener through the corresponding recess into a threaded bore of the alignment tab, wherein a gap is provided between the corresponding recess and the alignment tab while the camera mounting assembly is in the first position, and the gap is reduced while the camera mounting assembly is in the second position.

* * * * *